US010743550B2

(12) United States Patent
Huerta-Ochoa et al.

(10) Patent No.: US 10,743,550 B2
(45) Date of Patent: *Aug. 18, 2020

(54) MIXING MACHINE SYSTEM

(71) Applicant: ILLINOIS TOOL WORKS INC., Glenview, IL (US)

(72) Inventors: Ruben T. Huerta-Ochoa, Troy, OH (US); Lawrence S. Leung, Wilmington, OH (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/906,344

(22) Filed: Feb. 27, 2018

(65) Prior Publication Data

US 2018/0242595 A1 Aug. 30, 2018

Related U.S. Application Data

(60) Provisional application No. 62/464,435, filed on Feb. 28, 2017.

(51) Int. Cl.
*A21C 1/14* (2006.01)
*A21C 1/02* (2006.01)
(Continued)

(52) U.S. Cl.
CPC .............. *A21C 1/1455* (2013.01); *A21C 1/02* (2013.01); *A21C 1/147* (2013.01); *A47J 36/321* (2018.08);
(Continued)

(58) Field of Classification Search
CPC ........ A21C 1/145; A21C 1/455; A21C 1/1455
(Continued)

(56) References Cited

U.S. PATENT DOCUMENTS 1,767,002 A 6/1930 Meeker et al.
1,781,321 A 11/1930 DeHuff
(Continued)

FOREIGN PATENT DOCUMENTS

EP 2448220 5/2012
WO WO 2005/112722 12/2005
WO WO 2016/145430 9/2016

OTHER PUBLICATIONS

PCT, International Search Report and Written Opinion, International Application No. PCT/US2018/019832; dated May 14, 2018, 13 pages.

*Primary Examiner* — David L Sorkin
(74) *Attorney, Agent, or Firm* — Thompson Hine LLP (57) ABSTRACT

A mixing machine includes a head extending over a bowl receiving location, the head including a downwardly extending rotatable output shaft for receiving a mixer tool, the head including a planetary system therewithin for effecting rotation of the rotatable output shaft about its axis and orbiting of the shaft axis about another axis. A motor includes an output operatively connected to drive the planetary system. A control system includes a plurality of sensors, each sensor located for detecting a respective condition of mixing machine, and a diagnostic control operable to (i) track outputs from the plurality of sensors over time, (ii) analyze the tracked outputs and (iii) produce an alert indication based upon the diagnostic control identifying a performance characteristic indicative of a need for service or repair of the mixing machine.

11 Claims, 6 Drawing Sheets

(51) Int. Cl.
  *B01F 7/16* (2006.01)
  *B01F 15/00* (2006.01)
  *H02P 29/60* (2016.01)
  *A47J 43/07* (2006.01)
  *A47J 36/32* (2006.01)
  *A47J 43/044* (2006.01)

(52) U.S. Cl.
  CPC ......... *A47J 43/0755* (2013.01); *B01F 7/1605* (2013.01); *B01F 15/00175* (2013.01); *B01F 15/00201* (2013.01); *B01F 15/00305* (2013.01); *H02P 29/60* (2016.02); *A47J 2043/04481* (2013.01); *B01F 2215/0011* (2013.01)

(58) Field of Classification Search
  USPC .............................. 366/142, 206, 287, 288
  See application file for complete search history.

(56) References Cited

U.S. PATENT DOCUMENTS

| | | | |
|---|---|---|---|
| 2,019,911 A | 11/1935 | Meeker | |
| 2,181,079 A | 11/1939 | DeHuff | |
| 2,185,155 A | 12/1939 | Meeker et al. | |
| 2,251,903 A | 8/1941 | Anstice et al. | |
| 2,616,673 A | 11/1952 | Van Guilder | |
| 3,422,330 A | 1/1969 | Swanke | |
| 3,951,351 A | 4/1976 | Ernster et al. | |
| 4,568,193 A | 2/1986 | Contri et al. | |
| 4,697,929 A | 10/1987 | Muller | |
| 4,819,460 A | 4/1989 | Obradovic | |
| 4,822,172 A | 4/1989 | Stottmann | |
| 4,860,816 A | 8/1989 | Bond | |
| 4,893,942 A | 1/1990 | Stottmann | |
| 5,000,578 A | 3/1991 | Artin et al. | |
| 5,087,864 A | 2/1992 | Abel | |
| 5,140,248 A | 8/1992 | Rowan et al. | |
| 5,204,606 A | 4/1993 | Kuwahara et al. | |
| 5,306,083 A | 4/1994 | Caldwell et al. | |
| 5,348,393 A | 9/1994 | Pappas, Jr. | |
| 5,472,276 A | 12/1995 | Ratermann et al. | |
| 5,547,278 A | 8/1996 | Xie | |
| 5,570,955 A | 11/1996 | Swartwout et al. | |
| 5,653,535 A | 8/1997 | Xie et al. | |
| 5,690,427 A | 11/1997 | Jennings | |
| 5,736,828 A | 4/1998 | Turner et al. | |
| 5,844,343 A | 12/1998 | Horst | |
| 5,872,435 A | 2/1999 | Bolte et al. | |
| 5,906,432 A | 5/1999 | Wade et al. | |
| 5,934,802 A | 8/1999 | Xie | |
| 5,955,861 A | 9/1999 | Jeong et al. | |
| 5,957,021 A | 9/1999 | Meredith et al. | |
| 6,066,074 A | 5/2000 | Marcinkiewicz | |
| 6,313,597 B1 | 11/2001 | Elliott et al. | |
| 6,429,612 B1 | 8/2002 | Kume et al. | |
| 6,638,122 B1 | 10/2003 | Griffith, Sr. | |
| 6,704,212 B2 | 3/2004 | Furukawa et al. | |
| D490,271 S | 5/2004 | Short et al. | |
| 6,750,629 B2 | 6/2004 | Shigemizu et al. | |
| 6,756,757 B2 | 6/2004 | Marcinkiewicz | |
| 6,883,959 B2 | 4/2005 | Donthnier et al. | |
| 6,953,278 B2 | 10/2005 | Short et al. | |
| 6,972,541 B2 | 12/2005 | Matsushiro et al. | |
| 6,998,557 B2 | 2/2006 | McGuffin-Noll | |
| 7,005,825 B2 | 2/2006 | Eguchi | |
| 7,014,354 B2 | 3/2006 | Donthnier et al. | |
| 7,207,711 B2 | 4/2007 | Huang | |
| 7,273,315 B2 | 9/2007 | Huang | |
| 7,384,187 B2 | 6/2008 | Blackburn | |
| 7,387,430 B2 | 6/2008 | Short | |
| 7,543,980 B2 | 6/2009 | Blackburn | |
| 7,950,843 B2 | 5/2011 | Blackburn | |
| 8,308,344 B2 | 11/2012 | Short | |
| 2002/0093877 A1 | 7/2002 | Brunswick et al. | |
| 2003/0165068 A1 | 9/2003 | Tomonaga | |
| 2004/0008005 A1 | 1/2004 | Sakai et al. | |
| 2004/0120213 A1 | 6/2004 | Short et al. | |
| 2004/0120215 A1 | 6/2004 | Huang et al. | |
| 2004/0208082 A1 | 10/2004 | Huang | |
| 2005/0122836 A1 | 6/2005 | Boyle et al. | |
| 2005/0141340 A1 | 6/2005 | Donthnier et al. | |
| 2006/0044935 A1 | 3/2006 | Benelli | |
| 2006/0198240 A1 | 7/2006 | Short | |
| 2006/0227654 A1* | 10/2006 | Blackburn | A47J 43/0705 366/206 |
| 2007/0195641 A1 | 8/2007 | Schnipke | |
| 2008/0221739 A1 | 9/2008 | Pryor | |
| 2008/0291777 A1 | 11/2008 | Schnipke | |
| 2009/0110788 A1* | 4/2009 | Ciancimino | A21C 1/02 426/231 |
| 2009/0190438 A1* | 7/2009 | Short | A47J 43/0727 366/261 |
| 2011/0186668 A1* | 8/2011 | Seidler | A47J 27/004 241/98 |
| 2011/0241590 A1 | 10/2011 | Horikoshi | |
| 2012/0226764 A1 | 9/2012 | Philip | |
| 2013/0214716 A1 | 8/2013 | Barfus | |
| 2013/0293988 A1 | 11/2013 | Li | |
| 2014/0064018 A1* | 3/2014 | Lin | B01F 7/1605 366/142 |
| 2014/0070743 A1 | 3/2014 | Yoshida | |
| 2014/0269154 A1 | 9/2014 | Kolar | |
| 2014/0345474 A1 | 11/2014 | Trench | |
| 2015/0331051 A1 | 11/2015 | Maki | |
| 2018/0059790 A1 | 3/2018 | Kolar | |
| 2018/0242594 A1 | 8/2018 | Huerta-Ochoa | |

* cited by examiner

MIXING MACHINE SYSTEM

TECHNICAL FIELD

The present application relates generally to commercial mixers utilized for mixing food products such as dough, and more particularly to a commercial mixer and associated control and diagnostic system.

BACKGROUND

It is known in existing commercial mixers to provide multiple speed settings for the mixers. The various available mixing speeds are primarily driven by a motor through combinations of gears and/or belts and/or variable adjustable pulleys, where mechanical adjustments are made to change mix speeds. Many such devices require that the mixer be stopped in order to change speeds.

U.S. Pat. No. 7,207,711 is representative of a mixer that does not utilize mechanical adjustment of any drive linkage or gear system to change speeds, but instead simply adjusted the output speed of, for example, an AC induction motor. Even with the advantages provided by such a mixing machine drive and control arrangement, due to the relatively harsh operating conditions for such machines, service/repair issues regularly arise. In today's environment, such service/repair issues are handled on a reactive basis, which in some cases can result in undesirable down time for the mixing machine.

It would be desirable to provide a mixing machine that enables proactive service/repair and/or more effective service/repair to reduce any mixing machine down time.

SUMMARY

In one aspect, a mixing machine includes a control system with a drive for operating the motor, a plurality of sensors for detecting respective conditions of mixing machine, and a diagnostic control operable to track outputs from the sensors over time, analyze the outputs and produce an alert upon detection of a characteristic indicative of a need for service or repair.

In another aspect, a mixing machine includes a head extending over a bowl receiving location, the head including a downwardly extending rotatable output shaft for receiving a mixer tool, the head including a gear system therewithin for effecting rotation of the rotatable output shaft about its axis and orbiting of the shaft axis about another axis. A motor includes an output operatively connected to drive the gear system. A control system includes a drive for operating the motor, a plurality of sensors, each sensor located for detecting a respective condition of mixing machine, and a diagnostic control operable to (i) track outputs from the plurality of sensors over time, (ii) analyze such tracked outputs and (iii) produce an alert indication based upon the diagnostic control identifying a performance characteristic indicative of a need for service or repair of the mixing machine.

In a further aspect, a mixing machine includes a head extending over a bowl receiving location, the head including a downwardly extending rotatable output shaft for receiving a mixer tool, the head including a planetary system therewithin for effecting rotation of the rotatable output shaft about its axis and orbiting of the shaft axis about another axis. A motor includes an output operatively connected to drive the planetary system. A control system includes a plurality of sensors, each sensor located for detecting a respective condition of mixing machine, and a diagnostic control operable to (i) track outputs from the plurality of sensors over time, (ii) analyze the tracked outputs and (iii) produce an alert indication based upon the diagnostic control identifying a performance characteristic indicative of a need for service or repair of the mixing machine.

The details of one or more embodiments are set forth in the accompanying drawings and the description below. Other features, objects, and advantages will be apparent from the description and drawings, and from the claims.

DESCRIPTION

Figure 1:
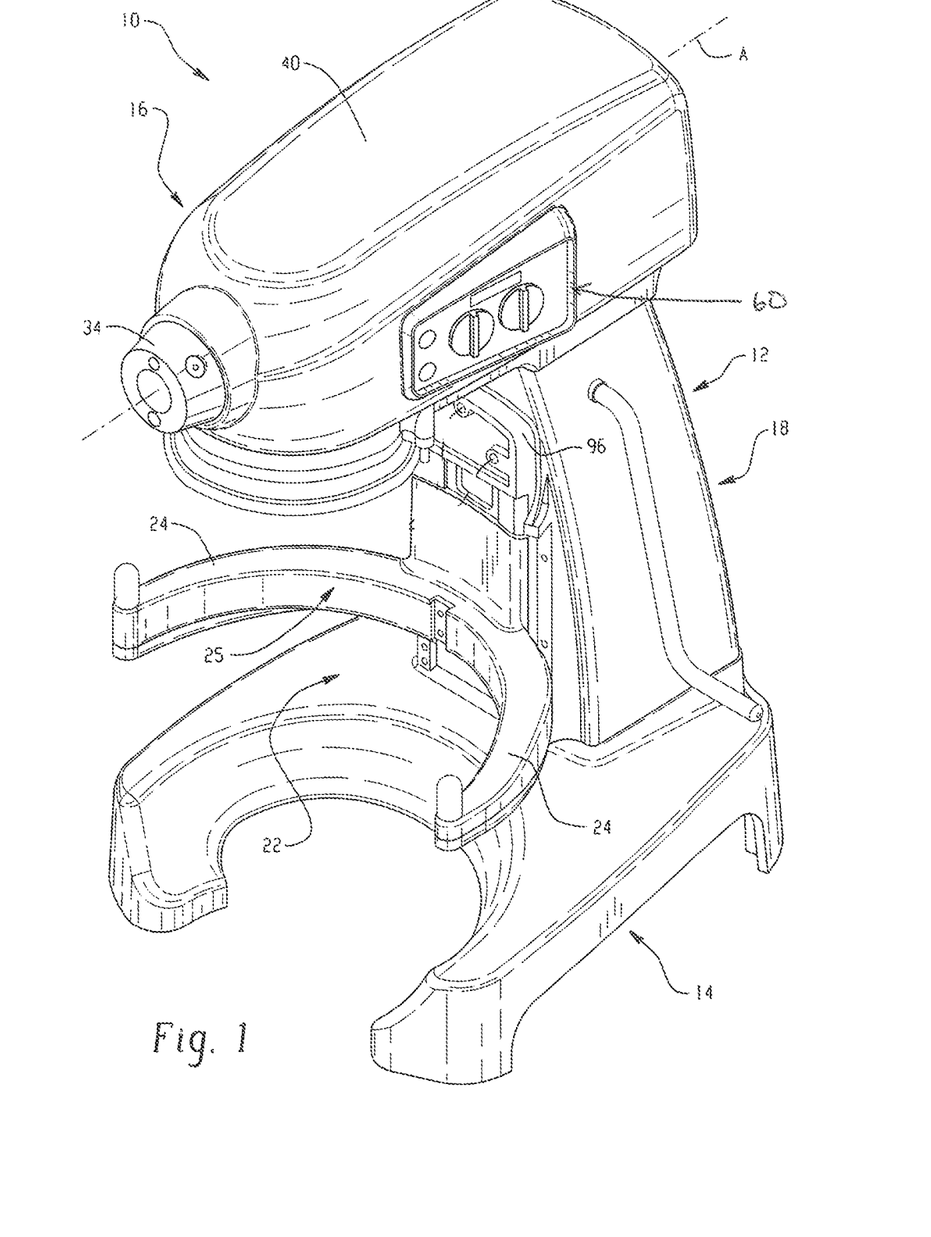
FIG. 1 shows a perspective view of a mixing machine.
Figure 2:
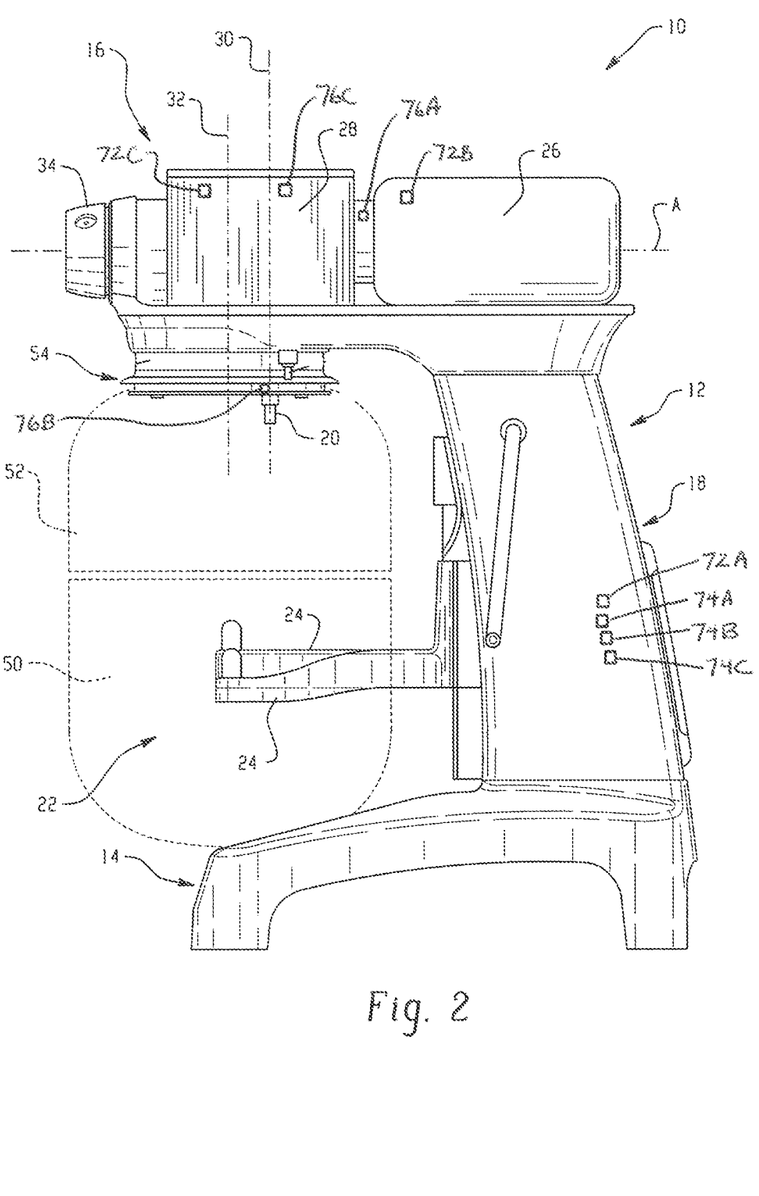
FIG. 2 shows a side view of the mixing machine of FIG. 1 with head cover removed.

Referring to FIGS. 1-2, a mixing machine 10 includes a mixer body 12 having a base portion 14, a head portion 16 and a support portion 18 (e.g., in the form of a column) connecting the head portion and the base portion in a vertically spaced apart relationship. A front to back head portion axis A is shown. An output member 20 (e.g., a shaft for receiving a mixer tool such as a beater or whip) extends downward from the head portion 16 in a direction toward a bowl receiving location 22 formed between the arms 24 of a bowl receiving yoke that can be moved upward and downward relative to the head portion 16 by rotation of the illustrated handle. Powered movement of the yoke is also possible. A motor 26 may be mechanically linked to the output member 20, as by a gear system 28, for effecting rotation of the output member about a first axis 30 and orbiting movement of the output member 20 and first axis 30 about a second axis 32 (e.g., a planetary movement or planetary rotation). A power take off 34 extends outwardly from a front side of the head portion 16 and may take the form of a protruding hub or boss that is adapted for connection with mixer accessories such as meat grinders, slicers etc. Internal of the power take off 34 is a drive member that is rotated by the motor 26 via the gear system 28. Head cover 40 is shown installed in FIG. 1, but is removed in FIG. 2.

An exemplary mix position of a bowl 50 is shown schematically in FIG. 2, along with an exemplary position of a bowl guard assembly 52. Bowl guard support 54 is located at the underside of the head portion 16 of the mixer and supports at least part of the bowl guard assembly 52 in a manner that enables the part to be moved between a bowl guarding position and a bowl access position.

Figure 3:
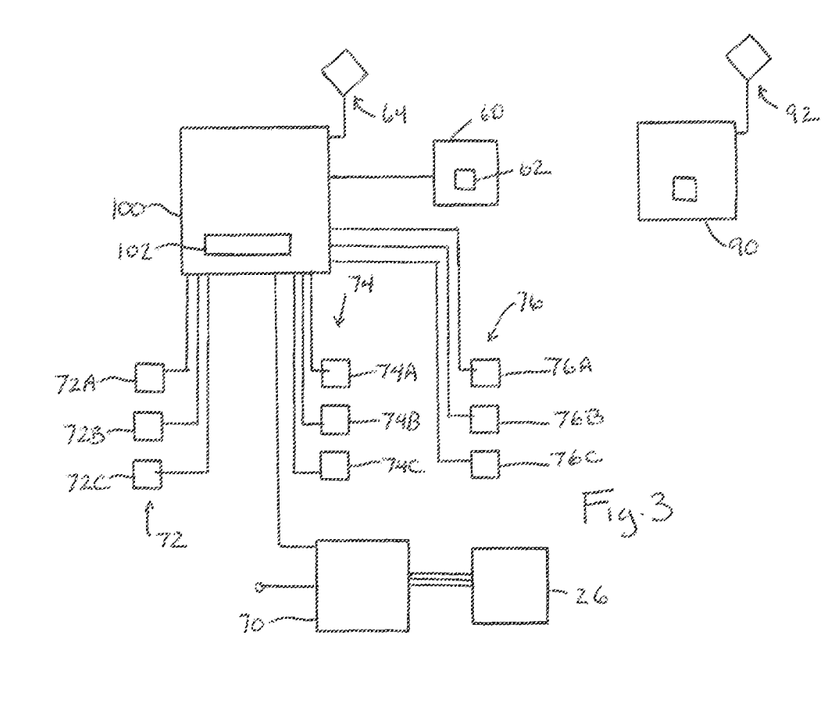
FIG. 3 shows an exemplary control system for the mixing machine.

The mixing machine also includes a user interface 60 with manual user controls (e.g., physically movable buttons, knobs and/or switches) and/or electronic user input controls (e.g., a touch-screen interface), with an associated processor-based controller (e.g., control board(s)) 100. The user interface 60 may have one or more display fields or screens 62 (FIG. 3). One or more communication paths 64 can be associated with the controller, such as a wired communication path (e.g., USB, RS485, etc.) or a wireless communication path 64 (e.g., any of Bluetooth, ZigBee, NFC, LAN/WiFi, MAN/WiMAX, LoRaWAN or WAN/Cellular). The communication path(s) enable communication between the mixing machine control system and external/remote devices or systems 90 with respective communications 92.

The mixing machine control system may include a drive 70 for operating the motor 26 (e.g., a simple drive in the case of a single speed motor or a more dynamic drive, such as a variable frequency drive (VFD), in the case of a variable speed motor).

The mixing machine includes a plurality of sensors for detecting various operating conditions of mixing machine. For example, a set of temperatures sensors 72 (e.g., a controller/VFD heat sink temperature sensor 72A, a motor stator temperature sensor 72B and/or a transmission case temperature sensor 72C), power consumption sensors 74 (e.g., a voltage sensor 74A, a current sensor 74B and/or additional current sensor 74C) and/or mechanical sensors 76 (e.g., a motor shaft position encoder 76A, an output shaft position encoder 76B and/or a transmission case accelerometer 76C) can be provided at various locations in the mixing machine to detect respective conditions of the mixing machine as shown.

A diagnostic control 102 is provided as part of the controller 100 configuration and is operable to track outputs from the various sensors over time. In one implementation, the diagnostic control 102 identifies maximum or minimum condition indicated by each sensor during each mixing operation carried out and stores such maximum or minimum condition in memory for analysis. The diagnostic control 102 is also operable to analyze the stored outputs and produce an alert or alerts upon detection of a characteristic indicative of a need for service or repair of the mixing machine. Exemplary diagnostic alert messages may include motor overheating, transmission overheating, open circuit, short circuit, machine overloading, locked rotor, transmission damage or failure and/or bearing and shaft damage or failure. The alerts may be delivered to one or more of (i) the on-board user interface 60, (ii) a remote device or system 90 (e.g., a mixing machine operator phone, Tablet or computer at the facility where the mixing machine is located, or a service technician phone, Tablet or computer remote from the facility where the mixing machine is located). The alerts may be in the form of a warning message if the characteristic is a trend of one of the conditions toward a defined limit (e.g., preset in memory) over time, or may be a fault message if the characteristic is the one of the conditions actually reaching the defined limit.

In this regard, Table 1 below shows exemplary sensors employed in one implementation of a mixing machine, and Table 2 below shows exemplary diagnostic messages identified and generated by the diagnostic control as alert indications.

TABLE 1

Exemplary Sensor(s)
Mixing Machine Sensors

Controller/VFD Heat Sink Temperature 72A
Motor Stator Temperature 72B
Transmission Case Temperature 72C
Input Voltage 74A
Input Electric Current 74B
Output Electrical Current 74C
Motor Shaft Position Encoder 76A
Output Shaft Position Encoder 76B
Transmission Case Accelerometer 76C

TABLE 2

Exemplary Diagnostic Alert Indications

| Diagnostic | Warning Alert | Fault Alert |
| --- | --- | --- |
| Motor Overheating | If motor temperature (per 72B) trends towards a temperature limit | If motor temperature (per 72B) exceeds a temperature limit |
| Transmission Overheating | If transmission temperature (per 72C) trends towards a temperature limit | If transmission temperature (per 72C) exceeds a temperature limit |
| Open Circuit | If input current (per 74B) goes to zero | If input current (per 74B) remains at zero |
| Short Circuit - line side | N/A | If input current (per 74B) and input current rate of change exceed a defined limit |
| Short Circuit - load side | N/A | If output current (per 74C) exceeds a defined limit due to ground fault in the output circuit or missing phase reported to lose wire |
| Machine Overloading | If power consumption ($I^2t$ logic) trends toward a limit | If power consumption ($I^2t$ logic) exceeds a limit |
| Locked Rotor | N/A | Motor shaft speed (per 76A) and output shaft speed (per 76B) remain at or near zero after motor startup |
| Transmission Failure | N/A | If output shaft speed (per 76B) remains at or near zero after motor startup (but motor shaft speed does not) |
| Bearing and Shaft | If vibration (per 76C) trends toward a vibration limit | If vibration (per 76C) exceeds a vibration limit |

Figure 4A:
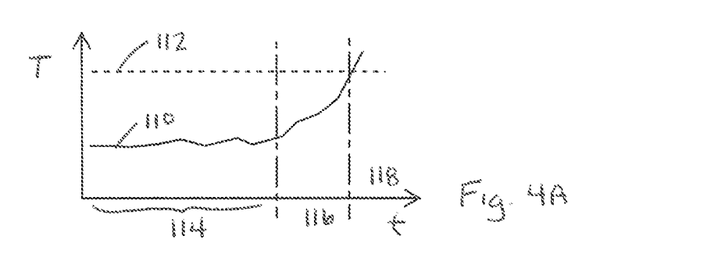
FIGS. 4A-4G show exemplary diagnostic graphs implemented by the control system.
Figure 4B:
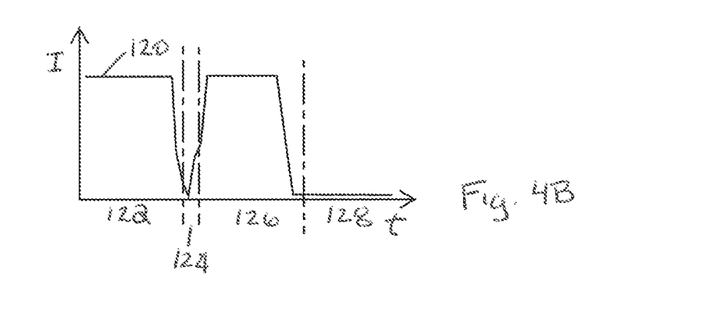
Figure 4C:
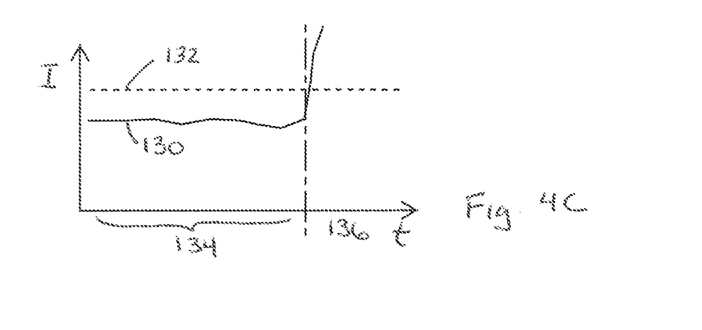
Figure 4D:
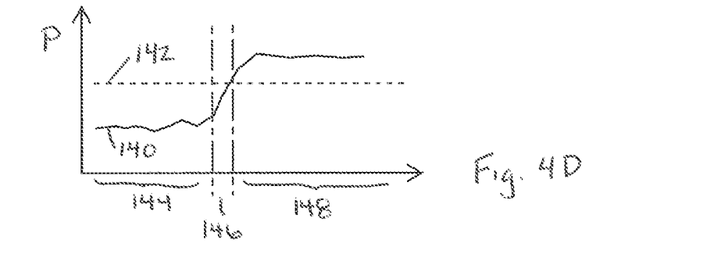
Figure 4E:
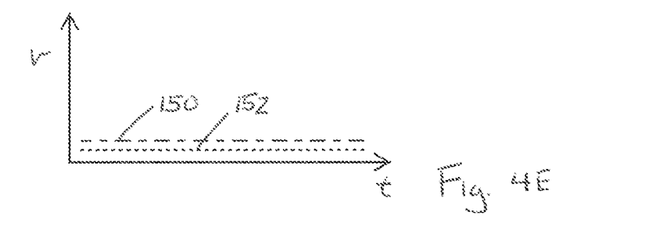
Figure 4F:
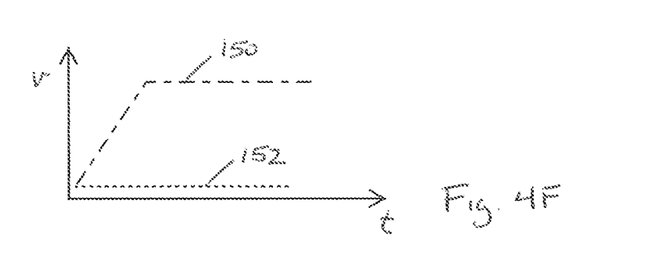
Figure 4G:
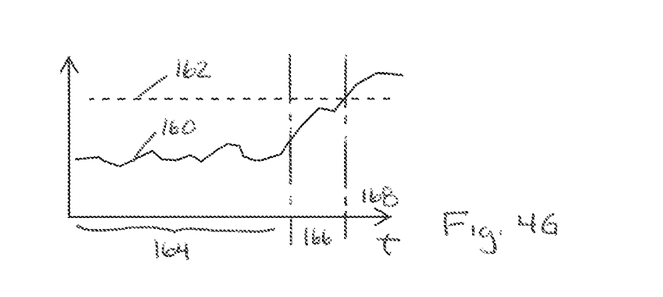

In relation to the above noted messages, reference is made to FIGS. 4A-4G showing representative graphs of sensor conditions over time for specific diagnostics. FIG. 4A shows an exemplary temperature diagnostic (either motor or transmission or VFD) in which the temperature condition 110 indicated by the sensor relative to a set temperature limit 112 is shown, where the diagnostic control would operate with no alert in zone 114, a warning alert in zone 116 and a fault alert zone 118. FIG. 4B shows an exemplary open circuit diagnostic with input current 120 going to zero in zone 124 and remaining at zero in zone 128, where the diagnostic control would operate with no alert in zones 122 and 126, a warning alert in zone 124 and a fault alert in zone 128. FIG. 4C shows an exemplary short circuit diagnostic in which input current 130 is shown relative to a set current limit 132, in which the diagnostic control operates to produce no alert in zone 134 and a fault alert in zone 136. FIG. 4D shows an exemplary machine overload diagnostic in which power consumption 140 is shown relative to a set limit 142, in which the diagnostic control would operate with no alert in zone 144, a warning alert in zone 146 and a fault alert in zone 148. FIG. 4E shows an exemplary locked rotor diagnostic in which both motor shaft speed 150 and output shaft speed 152 are shown as being zero (or near zero), where the diagnostic control would produce a fault alert. FIG. 4F shows an exemplary transmission failure diagnostic in which both motor shaft speed 150 and output shaft speed 152 are shown, where the diagnostic control would produce a fault alert. FIG. 4G shows an exemplary bearing and shaft diagnostic in which vibration level 160 is shown relative to a set vibration limit 162, where the diagnostic control would operate with no alert in zone 164, a warning alert in zone 166 and a fault alert in zone 168.

In some cases, the mixing machine control system includes multiple stored mix programs. For example, each mix program could include at least one mix speed and mix time, or in other cases multiple mix speeds with respective mix times, each of which will be carried out in sequence when the mix program is initiated and run on the machine. Each mix program may be selectable via the user interface of the machine. In such cases, the diagnostic control will track outputs from the sensors over time according to the mix program that results in the outputs, so that analysis of the outputs for detection of the characteristic indicative of a need for service or repair is conducted on a mix program by mix program basis. In this manner, potential condition discrepancies caused by differences between mixing operations can be avoided. By way of example, where a temperature condition is being monitored, the diagnostic control may include one temperature limit for a first mix program and another temperature limit for a second mix program, etc. Where an input current condition is being monitored, the diagnostic control may include one input current limit for a first mix program and another input current limit for a second mix program, etc. Where a power consumption condition is being monitored, the diagnostic control may include one power consumption limit for a first mix program and another power consumption limit for a second mix program, etc. Where a vibration condition is being monitored, the diagnostic control may include one vibration limit for a first mix program and another vibration limit for a second mix program, etc.

The on-board diagnostic control may be initially loaded with starting values for the monitored conditions by running each mixing program one or more times as a diagnostic set-up. The maximum or minimum limits for the conditions for each mixing program can then be set accordingly (e.g., selecting a limit that is a specified amount higher than the initial condition value determined during the diagnostic set-up). The on-board diagnostic control may run the diagnostics analysis of the data continuously or occasionally (e.g., at the end of each mixing operation, at the end of each day or each time the mixing machine is powered up).

Figure 5:
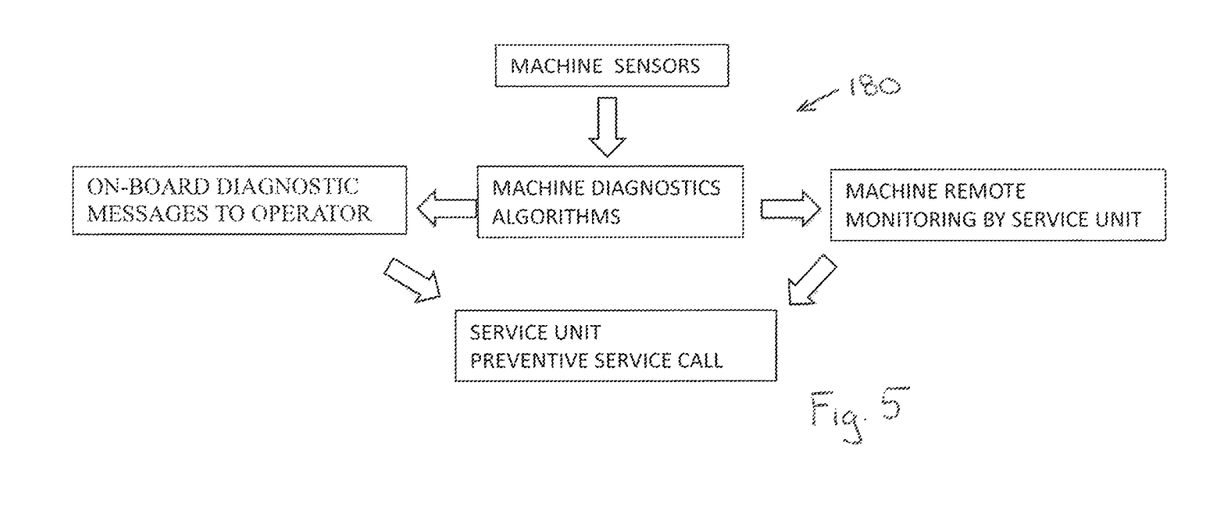
FIG. 5 shows an exemplary maintenance/service system diagram of information flows.

The on-board diagnostic control may include more advanced features to not only produce an alert indication, but also to recommend specific service/repair actions. In other cases, the remote service technician device or system may include algorithms and further diagnostics to provide the service technician with such recommended service/repair actions. Predictive service/repair may be achieved that, in the long run, reduces mixing machine down time, as suggested by the system diagram 180 in FIG. 5. Moreover, the on-board diagnostic may be configured to disable a certain function or functions of the mixing machine (e.g., prevent mixing above a certain speed), or to shut down the machine, when a particular performance characteristic is identified.

It is to be clearly understood that the above description is intended by way of illustration and example only, is not intended to be taken by way of limitation, and that other changes and modifications are possible.

What is claimed is:

1. A mixing machine, comprising:
   a head extending over a bowl receiving location, the head including a downwardly extending rotatable output shaft for receiving a mixer tool, the head including a gear system therewithin for effecting rotation of the rotatable output shaft about its axis and orbiting of the shaft axis about another axis;
   a motor having an output operatively connected to drive the gear system;
   a control system including a drive for operating the motor, a plurality of sensors, each sensor located for detecting a respective condition of mixing machine, a memory and a diagnostic control configured to (i) track outputs from the plurality of sensors over time by storing the outputs in the memory, (ii) analyze the outputs stored in the memory and (iii) produce an alert indication based upon the diagnostic control identifying, based upon the analysis of the outputs stored in the memory, a performance characteristic indicative of a need for service or repair of the mixing machine.

2. The mixing machine of claim 1 wherein the control system is configured to deliver the alert indication to one or more of (i) and on-board user interface of the mixing machine or (ii) a remote device or system.

3. The mixing machine of claim 2 wherein the remote device or system is one of a remote operator device or system or a remote service technician device or system.

4. The mixing machine of claim 2 wherein the diagnostic control is configured to selectively produce multiple different alert indications as required, each alert indication having a respective alert type corresponding to a respective performance characteristic, and the controller is configured to identify whether to deliver the alert indication to the on-board user interface and/or to the remote device or system based upon the alert type associated with the alert indication.

5. The mixing machine of claim 1 wherein the alert indication is in the form of (i) a warning message if the performance characteristic is a trend of one condition toward a defined limit while the one condition remains below the defined limit or (ii) a fault message if the performance characteristic is that one condition has reached the defined limit.

6. The mixing machine of claim 5 wherein the one of the conditions is one of a motor temperature condition, a motor shaft speed condition, a transmission temperature condition, an input current condition, an output current condition, a power consumption condition, an output shaft speed condition, or a vibration condition.

7. The mixing machine of claim 1 wherein the control system includes multiple stored mix programs, each mix program selectable via a user interface of the machine, wherein the diagnostic control is configured to track outputs from the plurality of sensors over time by linking, in the memory, each output to the particular mix program that is running when the output is produced so that analysis of the outputs stored in memory for detection of the performance characteristic indicative of a need for service or repair is conducted on a mix program by mix program basis by the diagnostic control.

8. The mixing machine of claim 7 wherein:
   at least one condition is a temperature condition and the diagnostic control includes a first temperature limit for a first mix program and a second temperature limit for a second mix program, where the second temperature limit is different than the first temperature limit; and/or
   at least one condition is an input current condition and the diagnostic control includes a first input current limit for a first mix program and a second input current limit for a second mix program, where the second input current limit is different than the first input current limit; and/or
   at least one condition is a power consumption condition and the diagnostic control includes a first power consumption limit for a first mix program and a second power consumption limit for a second mix program, where the second power consumption limit is different than the first power consumption limit; and/or
   at least one condition is a vibration condition and the diagnostic control includes a first vibration limit for a first mix program and a second vibration limit for a second mix program, where the second vibration limit is different than the first vibration limit.

9. The mixing machine of claim 7 wherein:

at least one condition is a temperature condition and the diagnostic control includes a first temperature limit for a first mix program and a second temperature limit for a second mix program, where the second temperature limit is different than the first temperature limit; and at least one condition is one of:
   an input current condition and the diagnostic control includes a first input current limit for a first mix program and a second input current limit for a second mix program, where the second input current limit is different than the first input current limit; or
   a power consumption condition and the diagnostic control includes a first power consumption limit for a first mix program and a second power consumption limit for a second mix program, where the second power consumption limit is different than the first power consumption limit;

and at least one condition is a vibration condition and the diagnostic control includes a first vibration limit for a first mix program and a second vibration limit for a second mix program, where the second vibration limit is different than the first vibration limit.

10. A mixing machine, comprising:

a head extending over a bowl receiving location, the head including a downwardly extending rotatable output shaft for receiving a mixer tool, the head including a planetary system therewithin for effecting rotation of the rotatable output shaft about its axis and orbiting of the shaft axis about another axis;

a motor having an output operatively connected to drive the planetary system;

a control system including a plurality of sensors, each sensor located for detecting a respective condition of the mixing machine, a memory and a diagnostic control configured to (i) track outputs from the plurality of sensors over time by storing the outputs in the memory, (ii) analyze the outputs stored in the memory and (iii) produce an alert indication based upon the diagnostic control identifying, from analysis of the outputs stored in the memory, a performance characteristic indicative of a need for service or repair of the mixing machine;

wherein the diagnostic control is further configured to disable a specific function of the mixing machine when the diagnostic control identifies the performance characteristic indicative of a need for service or repair of the mixing machine.

11. A mixing machine, comprising:

a head extending over a bowl receiving location, the head including a downwardly extending rotatable output shaft for receiving a mixer tool, the head including a gear system therewithin for effecting rotation of the rotatable output shaft about its axis and orbiting of the shaft axis about another axis;

a motor having an output operatively connected to drive the gear system;

a control system including a drive for operating the motor, at least one sensor located for detecting a specific condition of the mixing machine, a memory and a diagnostic control configured to (i) track outputs from the sensor over time by storing the outputs in the memory, (ii) analyze the outputs stored in memory and (iii) produce an alert indication based upon the diagnostic control identifying, based upon the analysis of the outputs stored in memory, a performance characteristic associated with the specific condition and indicative of a need for service or repair of the mixing machine;

wherein the specific condition is one of a motor temperature condition, a motor shaft speed condition, a transmission temperature condition, an input current condition, an output current condition, a power consumption condition, an output shaft speed condition, or a vibration condition.

* * * * *